No. 612,422. Patented Oct. 18, 1898.
A. E. KARSNER.
LID HOLDER AND KETTLE DRAINER.
(Application filed Jan. 20, 1897. Renewed Sept. 10, 1898.)
(No Model.)
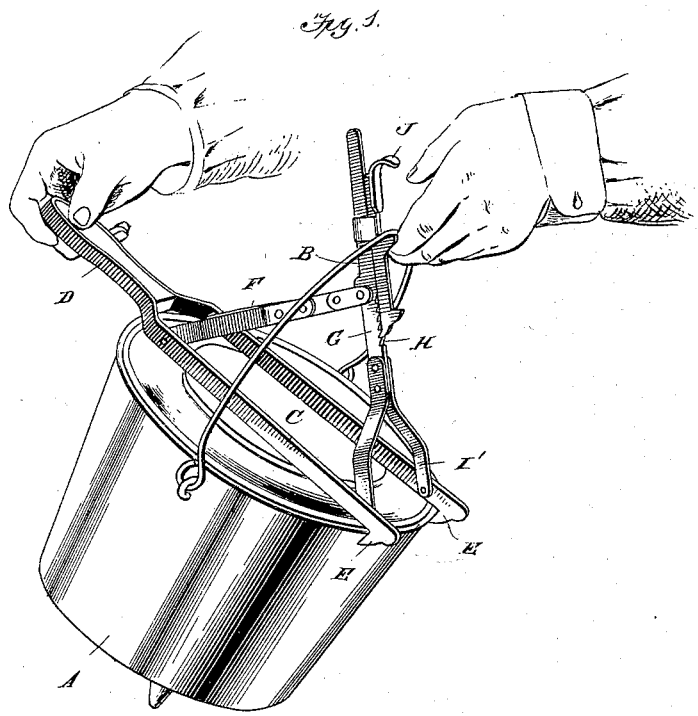
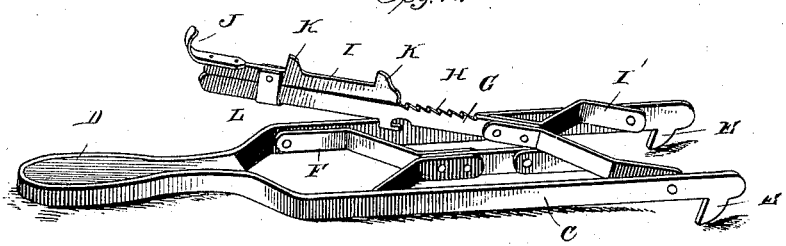
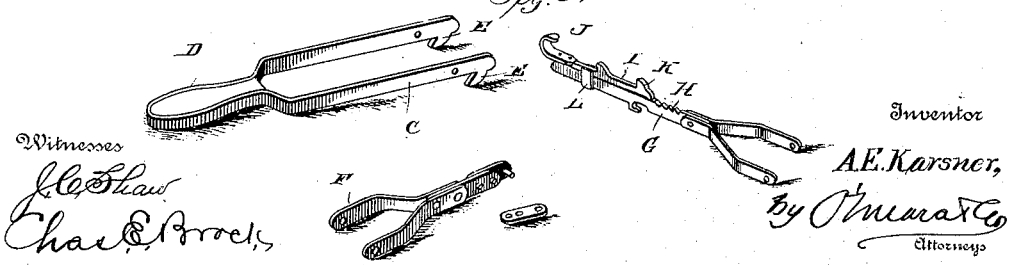
Witnesses
Inventor
A. E. Karsner,
By
Attorneys

UNITED STATES PATENT OFFICE.

ADAM E. KARSNER, OF CHILLICOTHE, MISSOURI, ASSIGNOR TO DONALD N. MACDONALD, OF CHICAGO, ILLINOIS.

LID-HOLDER AND KETTLE-DRAINER.

SPECIFICATION forming part of Letters Patent No. 612,422, dated October 18, 1898.

Application filed January 20, 1897. Renewed September 10, 1898. Serial No. 690,686. (No model.)

*To all whom it may concern:*

Be it known that I, ADAM E. KARSNER, residing at Chillicothe, in the county of Livingston and State of Missouri, have invented a new and useful Lid-Holder and Kettle-Drainer, of which the following is a specification.

This invention relates generally to pots and kettles, and particularly to certain improvements in lid-holders for use on pots, kettles, or the like.

One object of the invention is to provide a device by which the lid of a kettle or other receptacle containing vegetables or meats in a boiled state will be held securely in place while the liquid is being drained therefrom, thereby preventing any possibility of the person handling the kettle becoming injured by the escape of steam, &c.

A further object of the invention is to provide a lid-holder so constructed that it can be adjusted to fit any-sized kettle or kettle-bail that might be employed.

With these objects in view the invention consists in certain novel features of construction and in the combination or arrangement of parts, all of which will be more fully described hereinafter and particularly pointed out in the claims.

In the drawings forming a part of this specification, Figure 1 is a perspective view of my improved device, showing the kettle and the lid-holder in operative position. Fig. 2 is a perspective view of the holder in a folded or closed position. Fig. 3 shows in perspective the several parts comprising the device detached.

In the practical embodiment of my invention I employ an ordinary kettle A, having the usual retaining-staple for the reception of the bail B.

C indicates an approximately U-shaped frame having a rear extension forming a handle D. The frame C is open at its front end and is provided with the downwardly-extending fingers E for the purposes of engaging the edge of the pot or kettle.

F indicates a jointed connection removably secured to the rear portion of the frame C and connected by suitable links to a bar G. Connected to this bar G at its lower extremity are secured several diverging arms I', movably secured or pivoted to the front portion of the frame C. The bar G on its upper surface is provided with a series of ratchet-teeth H, and on these ratchet-teeth H slides a block I, engaging said ratchet-teeth. This block I is provided on its upper portion with a handle J and on its outer extremity with a series of upwardly-extending projections or hooks K, formed integral therewith.

L indicates a band acting as a keeper for the bar G and the block I.

The operation of the device is as follows: Supposing the device to be in operative position, as shown in Fig. 1, and it is desired to lift the pot or kettle from a stove and drain the liquid therefrom, the U-shaped frame is placed between the bail and the front fingers thereof are inserted below the annular flange of the vessel, thereby tightly gripping the flange of the receptacle proper and the lid thereof. The bar G is then raised and adjusted for the reception of the bail, which is hooked around the projections K, the ratchet-bar and the block acting as an adjusting means, so that the same can be raised or lowered to suit any-sized bail used upon a pot or kettle.

In tilting the pot or kettle one hand of the operator grasps the handle of the U-shaped frame, and the other hand can be employed to hold the bail against the hooks or projections K on the block I.

The device is very cheap and simple in construction, composed of a minimum number of parts, and by its use one is enabled to handle any-sized vessel containing hot fluid without the least danger of injury to the party handling the same.

It is evident that various slight changes might be made in the forms, constructions, and arrangements of the parts described without departing from the spirit and scope of my invention. Hence I do not wish to limit myself to the exact construction herein set forth, but consider myself entitled to all such changes as fall within the spirit and scope of my invention.

Having thus fully described my invention, what I claim as new, and desire to secure by Letters Patent, is—

1. A lid-holder for kettles or the like, comprising the approximately U-shaped frame, the downwardly-extending fingers at or near the free ends thereof, the toothed bar having the diverging arms pivoted near the free ends of said frame, a sliding block adapted to engage the teeth of said bar, and a link connection pivoted near the rear end of said frame and movably connected to said toothed bar as set forth.

2. A lid-holder, consisting of the approximately U-shaped frame, the downwardly-extending fingers on the free ends thereof, a toothed bar movably secured in said free front portion of the frame, a block having prongs or projections to engage said toothed bar and bail, and the jointed connection between the said bar and the rear part of the frame as set forth.

3. A lid-holder consisting of the frame having the rear closed end and the free open front ends provided with fingers, a toothed bar mounted therein carrying a sliding block, projections on said block for the support of the bail and connecting-links uniting the said frame and toothed bar for the purpose set forth.

4. In a lid-holder for pots, kettles or the like, the combination of the approximately U-shaped frame, the fingers at or near the free ends thereof, a handle formed in its closed end, a toothed bar pivoted near the said free ends of the frame, a block having a series of projections to engage the bail adapted to be adjustable on said toothed bar, and a link connection movably secured near the rear or closed end of said frame adapted to be secured to and support the toothed bar, substantially as set forth.

ADAM E. KARSNER.

Witnesses:
OLLIE DUNSTON,
W. J. GUNBY.